United States Patent [19]

Knorr

[11] Patent Number: 4,871,599

[45] Date of Patent: Oct. 3, 1989

[54] SUPPORT HELIX FOR A RADIALLY EXPANDED RESILIENT SLEEVE

[75] Inventor: Winfried Knorr, St. Paul, Minn.

[73] Assignee: Minnesota Mining and Manufacturing Company, St. Paul, Minn.

[21] Appl. No.: 181,732

[22] Filed: Apr. 14, 1988

[30] Foreign Application Priority Data

May 13, 1987 [DE] Fed. Rep. of Germany ....... 3715915

[51] Int. Cl.$^4$ ............................................. F16L 11/00
[52] U.S. Cl. ................................. 428/36.9; 428/34.9; 29/235; 138/122; 174/84 R; 174/135
[58] Field of Search ...................... 428/36, 34.9, 36.9; 29/235; 138/122; 174/84 R, 135

[56] References Cited

U.S. PATENT DOCUMENTS

| | | | |
|---|---|---|---|
| 3,515,798 | 6/1970 | Sievert | 174/135 |
| 4,135,553 | 1/1979 | Evans et al. | 138/141 |
| 4,338,970 | 7/1982 | Krackeler et al. | 138/141 |
| 4,389,440 | 6/1983 | Keith | 428/36 |
| 4,410,009 | 10/1983 | Blum | 138/109 |
| 4,503,105 | 3/1985 | Tomioka | 428/36 |

Primary Examiner—Ellis P. Robinson
Assistant Examiner—Archene A. Turner
Attorney, Agent, or Firm—Donald M. Sell; Walter N. Kirn; Terryl K. Qualey

[57] ABSTRACT

A support helix for a radially expanded sleeve of resilient material which may be used as an enclosure of an elongate object such as an electrical cable, comprising a tubular base body having a constant wall thickness through which circumferentially spaced cuts are formed in a helical pattern along the entire length of the base body. One end portion of the helix is separated from the helix into a strip extending from one end of the helix through the support helix and out of the other end thereof where it may be manually grasped. The connection areas between the spaced cuts are dimensioned so that the support helix can be manually unwound by pulling on the end portion extending through the support helix.

4 Claims, 3 Drawing Sheets

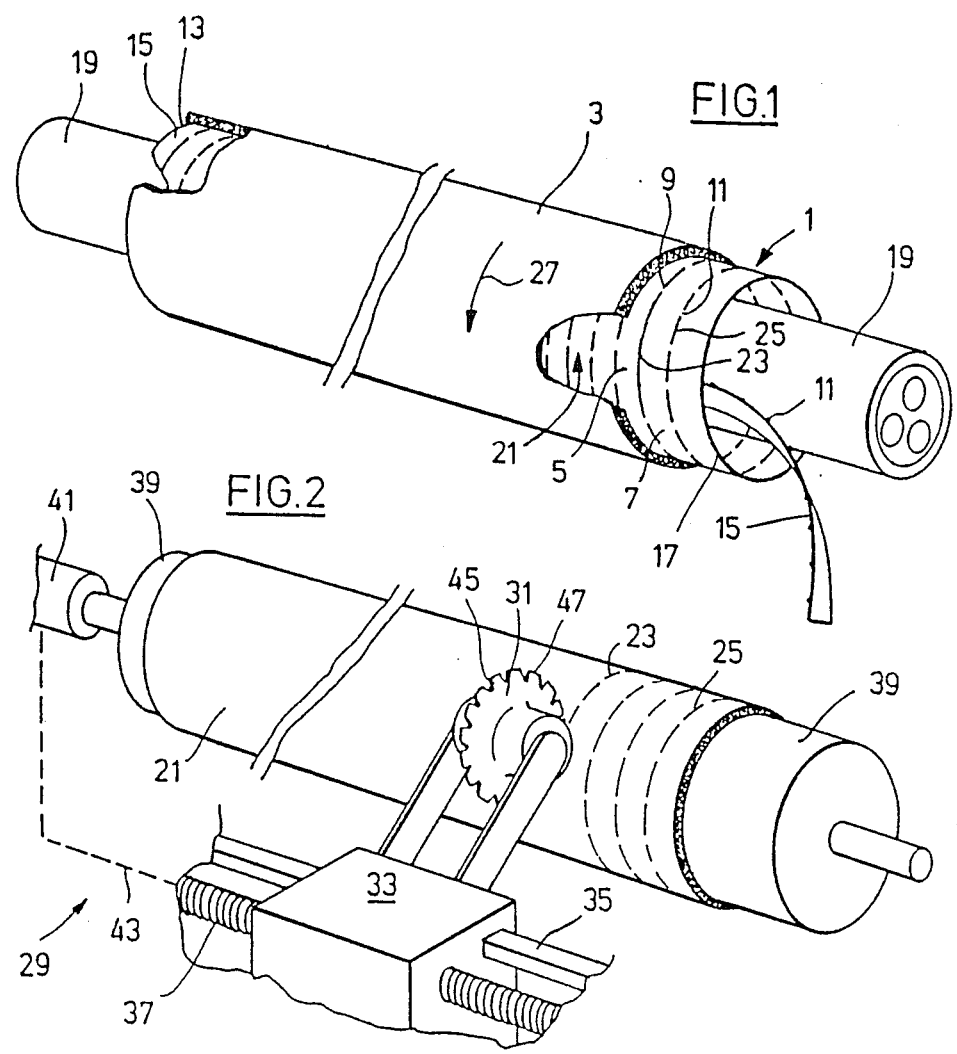
FIG.1
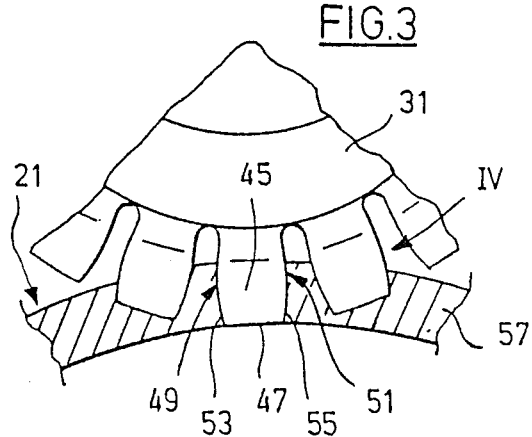
FIG.2
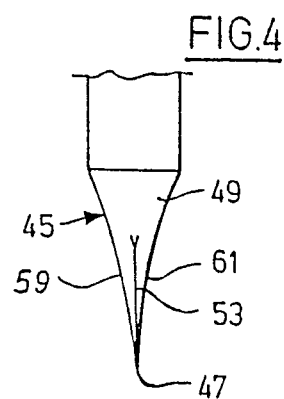
FIG.3
FIG.4

4,871,599

SUPPORT HELIX FOR A RADIALLY EXPANDED RESILIENT SLEEVE

TECHNICAL FIELD

The invention relates to a support helix for a radially expanded resilient sleeve that can be removed from the sleeve by pulling on one end of the helix material to pull the helix apart and out of the sleeve and to a device for manufacturing the support helix.

Support helices serve to permit a convenient application of radially pre-expanded resilient sleeves on elongate objects, for example electrical cables. After the support helix with the sleeve on it is slid onto the electrical cable over a cable connection or other break in the cable sheath, it only is necessary to pull the support helix out between the sleeve body and the cable to allow the sleeve to shrink tightly onto the cable.

BACKGROUND ART

The prior art includes support helices formed by a tube grooved in a helical line as disclosed in U.S. Pat. No. 3,515,798. However, it is difficult in manufacturing such a support helix to make a groove that will allow the helix to be pulled apart easily while maintaining sufficient strength to hold the helix together and support the resilient compression of the expanded resilient sleeve.

To overcome the above noted problem, the support helix of U.S. Pat. No. 4,389,440 is wound from a ribbon, and the connection areas are produced by welding or tacking. This is, however, an expensive process for making the helix. Another solution, disclosed in U.S. Pat. No. 4,503,105, is to make the tubular base body with a constant wall thickness, to include circumferentially spaced longitudinal ribs on the inside wall of the body and to cut through the constant wall thickness in a helical pattern leaving the spaced ribs to hold the helix together. This requires more material in the support helix and a larger diameter support helix for a specified internal clearance for the cable or other article to which the resilient sleeve is to be applied.

The objective is, of course, to make the support helix of an inexpensive material and to produce it inexpensively with as high as possible a strength against the compression force exerted by the sleeve while at the same time producing a helix that will unwind with as small a force as possible.

DISCLOSURE OF THE INVENTION

The present invention provides a support helix for a radially expanded sleeve of resilient material, which can be manufactured in a simple manner and which has a high radial strength, and a device for cutting the helix. The support helix comprises a tubular base body through which circumferentially spaced cuts are formed in a helical pattern along the entire length of the base body. One end portion of the helix is separated from the helix into a strip extending from one end of the helix through the support helix and out of the other end thereof where it may be manually grasped. The connection areas between the spaced cuts are dimensioned so that the support helix can be manually unwound by pulling on the end portion extending through the support helix. The device for cutting the support helix comprises a knife wheel adapted to be rolled on the tubular base body in a helical line and includes circumferentially distributed, radially projecting knives having circumferential blades extending essentially in the circumferential direction.

Since the support helix of the invention is manufactured by providing cuts in the tubular base body, neither winding nor welding or tacking steps are necessary, whereby the manufacture is possible in an easier and more rapid way, and a more uniform product will be obtained. The position and distribution of the connection areas can be freely selected, whereby an optimum design with respect to strength is possible, and identical tubular bodies can be provided with different arrangements of connecting areas.

Since only cutting steps are required for making the support helix from the tubular base body, high production speeds and a continuous production process can be realized with the device in accordance with the invention, and it is possible to serially manufacture support helices in mass production at low cost. For example, a continuously extruded tube can be simply cut into the desired lengths, and can be provided with the helical cuts prior to or after being cut into lengths. Variations of the size and/or the distribution of the connection areas are possible in a very simple manner by exchanging the knife wheel, or by changing the axial advance of the knife wheel per revolution of the base body relative to the knife wheel.

BRIEF DESCRIPTION OF THE DRAWING

The invention will be subsequently described in more detail by means of embodiments illustrated in the drawing in which FIG. 1 shows in a perspective illustration, an enclosure which is provided with a support helix in accordance with the invention, prior to the application to a cable, with parts of the resilient sleeve surrounding the support helix being broken away;

FIG. 2 shows in a perspective illustration, a preferred mode of manufacture of a support helix according the invention;

FIG. 3 illustrates in a radial sectional view details of the cutting process and the knife wheel;

FIG. 4 is a radial view of a knife in the sense of the arrow IV of FIG. 3, somewhat enlarged as compared t FIG. 3;

DETAILED DESCRIPTION

Figure 5:
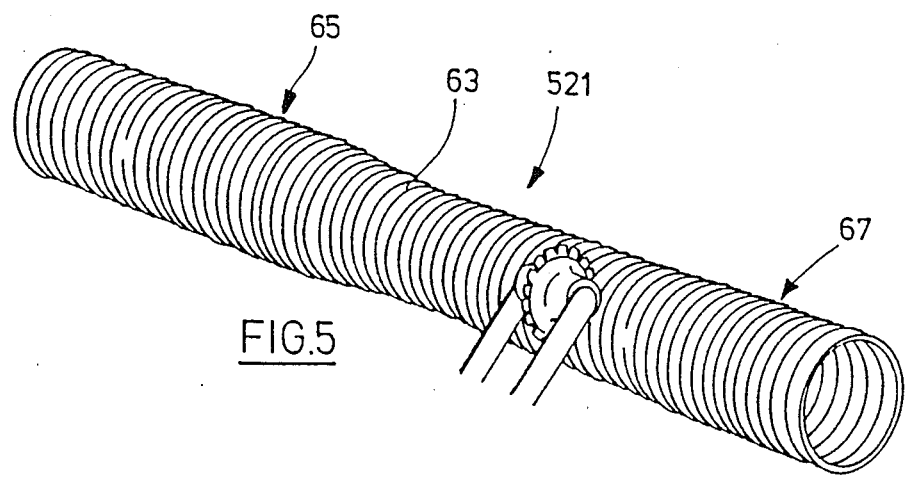
FIG. 5 illustrates, in a representation similar to FIG. 2, a possible mode of manufacturing a support helix according to the invention from a grooved base body.

FIG. 1 illustrates a support helix 1 inside a radially expanded sleeve 3 of resilient material, for example a polyurethane elastomer. Adjacent turns 5, 7 of the support helix 1 are interconnected in connection areas 9, 11 which are distributed across the circumference of the support helix 1, with non-interconnected circumferential areas being therebetween which essentially have the same wall thickness as the interconnection areas. The support helix 1 has an end portion 15 which is separated from the helix into a strip and extends from one end 13 of the support helix 1 through the support helix and can be gripped at the other end 17 of the support helix. The strength of the connection areas 9, 11, are dimensioned so that the support helix 1 can be manually unwound towards its interior by pulling at the end portion 15.

FIG. 1 illustrates the enclosing of an end portion of an electrical cable 19, as a usual application. The diameter of the cable 19 is smaller than the internal diameter of the support helix 1 but larger than the internal diameter which the resilient sleeve 3 would have in a non-expanded condition; accordingly, the cable 19 can be easily put through. Upon withdrawing the support helix 1, the sleeve body 3 will progressively constrict on the cable 19 and will finally tightly enclose the latter with a resilient bias.

The support helix 1 is formed by a tubular base body 21 in which the non-interconnected circumferential areas are formed by cuts 23, 25, which extend through the wall thickness of the base body 21. In the illustrated embodiment, the tubular base body 21 has an essentially uniform wall thickness and consists of an extruded smooth plastic tube for which a particular design is not necessary.

In the illustrated embodiment, the cuts 23, 25, are mutually offset in the circumferential direction 27 of the support helix 1, whereby the formation of linearly aligned non-interconnected areas is avoided. This increases the strength of the support helix 1.

FIG. 2 illustrates a method mode of manufacturing the support helix 1 by means of a device 29, which comprises a knife wheel 31 as an essential component. The knife wheel can be rolled on the tubular base body 21 in a helical line. To that end, the knife wheel 31 is supported in a cutting head 33 which is displaceable in a guide 35 and can be moved in the guide by means of a rotatable spindle 37. Beside the cutting head 33, the tubular base body 21 is attached, with its axis being parallel to the guide 35, in a fixture 39 which engages the ends of the base body 21 and can be rotatably driven by means of a gear motor 41. The gear motor 41 also drives the spindle 37, via a coupling 43, with a predetermined transmission ratio. A device, not illustrated, presses the knife wheel 31 onto the base body 21. For forming the cuts 23, 25, the knife wheel 31 has circumferentially distributed, radially projecting knives 45 with circumferentially extending circumferential blades 47.

In operation, the gear motor 41 rotates the fixture 39, with the base body 21 clamped therein, and the spindle 37 with predetermined rotational speeds. Thereby, the knife wheel 31 rolls on the base body 21 in a helical line 47, the pitch of which depends upon the ratio of the rotational speeds of the base body 21 and the spindle 37. In this operation, the knife wheel produces the cuts 23, 25.

FIGS. 3 and 4 illustrate the cutting process with a preferred design of the knife wheel 31. The knives have lateral faces 49, 51 which extend generally radially and merge towards the circumferential blade 47 to form lateral blades 53 and 55, respectively. Thereby, the penetration of the knives 45 into the wall 57 of the base body 21 is facilitated. In the illustrated embodiment, the lateral faces 49, 51 have a convex curvature and the knives 45 have a hollow grinding 59, 61 on both sides (FIG. 4). Both of these features also facilitate the cutting process.

FIG. 5 illustrates an alternative tubular base body 521 which has a helical circumferential groove 63. Such a base body can be manufactured in mass production for instance by blow molding and offers the advantage that the circumferential groove 63 determines the advance of the knife wheel 531, so that no special advancing device (e.g. the spindle 37 shown in FIG. 2) is necessary and it is possible to use base bodies which have portions 65, 67 of different diameters, as illustrated. Such base bodies can be useful if objects are to be enclosed which have portions of different diameters.

Figure 6:
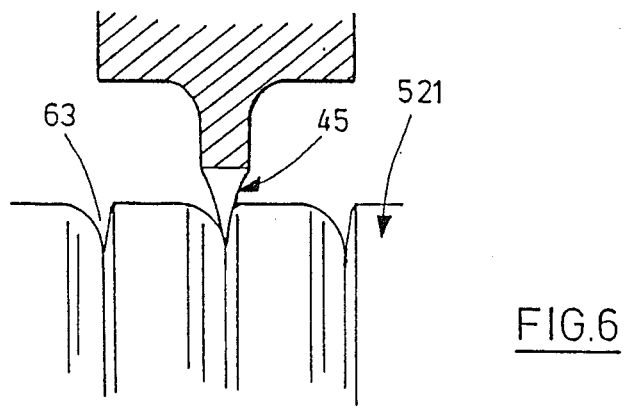
FIG. 6 shows details of FIG. 5 in an axial sectional view enlarged as compared to FIG. 5.

FIG. 6 illustrates the cutting process with the base body 521 of FIG. 5. The pre-shaped helical circumferential groove 63 facilitates the penetration of the knives 45.

Figure 7:
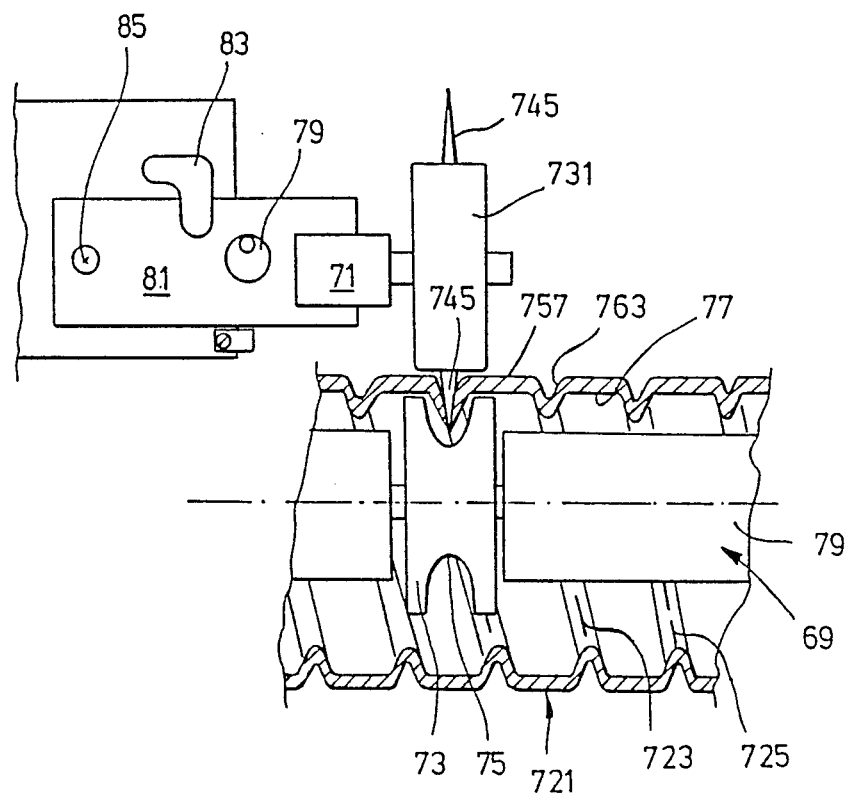
FIG. 7 is a plan view in section of a modified embodiment of a device for manufacturing support helices.

FIG. 7 illustrates a modified apparatus in which a guide 69 is provided for advancing a tubular base body 721 axially. The knife wheel 731 is rotatable by means of a motor 71. With such a device, it is possible to produce a desired helical line of cuts 723, 725, by axially advancing the base body along the driven knife wheel 731 which is stationary. In the illustrated embodiment, a particularly simple design and mode of operation is obtained in that the knife wheel 731 is designed and arranged for engagement into a helical peripheral groove 763 of the base body 721, the peripheral groove 763 defining the desired helical line. This will automatically result in the necessary axial advance of the base body 721.

Often it is appropriate to support the base body 721 towards the knife wheel 731 by at least one correspondingly arranged counter wheel in order to facilitate the cutting process. In the illustrated embodiment, such a counter wheel 73 is arranged so that it engages the base body 721 on its inside wall in an area which is disposed oppositely of the knife wheel 731. The counter wheel 73 has a circumferential recess 75 for the ends of the knives 745 penetrating through the wall 757 of the base body 721. The illustrated arrangement results in a particularly effective support in an extremely small space.

In the illustrated embodiment, the counter wheel 73 is also designed to engage a helical peripheral groove 763 of the base body 721; this peripheral groove is provided, in the illustrated base body 721, in the interior thereof. This will result in a support in an even more restricted space, and in an additional guiding of the base body 721.

In the illustrated embodiment, the guide 69 comprises a pin 79,, and the counter wheel 73 is journaled on the pin. This results in a simple and compact structure. In order that the knife wheel 731 and the counter wheel 73 will cooperate without interference, the guide 69 is preferably designed, as illustrated, to provide a radial play of the base body 721. In the illustrated embodiment, the knife wheel 731 is attached together with its drive 71 and a switch 79, at a pivot plate 81 which can be adjusted by means of an arresting handle 83 about a pivot axis 85 disposed perpendicular to the plane of the drawing, between the illustrated working position and a rest position in which the knife wheel 731 is pivoted away from the guide 69. In this rest position (not illustrated), a fresh base body 721 can be put on the guide 69.

In the base body 721 illustrated in FIG. 7, the described peripheral groove 763 is provided by the outer and inner sides, respectively, of a smoothly undulating structure, i.e. not by a sharp edge. It has been found that with base bodies of this design, substantially higher strengths are obtained than with sharp grooved base bodies, whereby applications become possible which are practically impossible with support helices known hitherto because of the required high supporting forces. Such a base body can be easily produced, for example, by blow molding. It will provide a high strength even after the cuts have been produced. Since there are no axially extending ribs, the weight is small, and the bas body has a flexibility which is desirable for many applications.

I claim:

1. A support helix for a radially expanded sleeve of resilient material which may be used as an enclosure of an elongate object such as an electrical cable, comprising a molded tubular base body having an undulating exterior surface defining a helical groove along the entire length of the base body, circumferentially spaced cuts being formed through the wall of the base body in the helical groove along the entire length of the base body, one end portion of the helix being separated from the helix into a strip extending from one end of the helix through the support helix and out of the other end thereof where it may be manually grasped, the connection areas between the spaced cuts being dimensioned so that the support helix can be manually unwound by pulling on the end portion.

2. The support helix of claim 1 wherein the tubular base body has an essentially uniform wall thickness.

3. The support helix of claim 1 wherein the cuts of are arranged so as to avoid a linear alignment of the cuts along the length of the base body.

4. The support helix of claim 2 wherein the interior and exterior surfaces of the wall of said tubular base body are smoothly undulating to define the helical groove,

* * * * *